(12) United States Patent
Kaneko

(10) Patent No.: US 11,101,478 B2
(45) Date of Patent: Aug. 24, 2021

(54) FUEL CELL SYSTEM AND CONTROL METHOD OF FUEL CELL SYSTEM

(71) Applicant: NISSAN MOTOR CO., LTD., Yokohama (JP)

(72) Inventor: Youhei Kaneko, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 129 days.

(21) Appl. No.: 16/321,890

(22) PCT Filed: Aug. 10, 2016

(86) PCT No.: PCT/JP2016/073647
§ 371 (c)(1),
(2) Date: Jan. 30, 2019

(87) PCT Pub. No.: WO2018/029829
PCT Pub. Date: Feb. 15, 2018

(65) Prior Publication Data
US 2019/0165393 A1 May 30, 2019

(51) Int. Cl.
| | | |
|---|---|---|
| *H01M 8/04701* | (2016.01) | |
| *H01M 8/0432* | (2016.01) | |
| *H01M 8/04746* | (2016.01) | |
| *H01M 8/04007* | (2016.01) | |
| *H01M 8/04119* | (2016.01) | |
| *H01M 8/124* | (2016.01) | |

(Continued)

(52) U.S. Cl.
CPC ......... *H01M 8/04701* (2013.01); *B60L 50/00* (2019.02); *H01M 8/0435* (2013.01);
(Continued)

(58) Field of Classification Search
CPC ......... H01M 8/04716; H01M 8/04007; H01M 8/04343; H01M 8/0435; H01M 8/04701
See application file for complete search history.

(56) References Cited

U.S. PATENT DOCUMENTS

| 7,326,483 B2 | 2/2008 | Hamada et al. |
|---|---|---|
| 2005/0112431 A1 | 5/2005 | Hamada et al. |

(Continued)

FOREIGN PATENT DOCUMENTS

| JP | 2004-192958 A | 7/2004 |
|---|---|---|
| JP | 2005-158509 A | 6/2005 |

(Continued)

OTHER PUBLICATIONS

JP-2009283243-A English machine translation (Year: 2020).*
JP-2008210632-A English machine translation (Year: 2020).*

*Primary Examiner* — Ula C Ruddock
*Assistant Examiner* — Armindo Carvalho, Jr.
(74) *Attorney, Agent, or Firm* — Foley & Lardner LLP

(57) ABSTRACT

The fuel cell system according to one embodiment of the present invention includes the solid oxide fuel cell configured to generate power by receiving the supply of the cathode gas and the anode gas. The fuel cell system includes a discharging passage configured to discharge the cathode off-gas and the anode off-gas discharged by the fuel cell as discharged gas to the outside, a discharged-gas temperature detection unit configured to detect or estimate the temperature of the discharged gas discharged from the discharging passage, an air supplying unit configured to supply air to the discharging passage, and the control unit configured to control the air supply to be executed by an air supplying unit on the basis of the detected or estimated temperature.

6 Claims, 8 Drawing Sheets

(51) Int. Cl.
  *B60L 50/00* (2019.01)
  *B60L 50/50* (2019.01)
(52) U.S. Cl.
  CPC ... *H01M 8/04074* (2013.01); *H01M 8/04156* (2013.01); *H01M 8/04343* (2013.01); *H01M 8/04716* (2013.01); *H01M 8/04753* (2013.01); *H01M 2008/1293* (2013.01); *H01M 2250/20* (2013.01)

(56) References Cited

U.S. PATENT DOCUMENTS

| | | | | |
|---|---|---|---|---|
| 2006/0237583 | A1* | 10/2006 | Fucke | H01M 8/04014 244/58 |
| 2014/0186732 | A1* | 7/2014 | Tachibana | B60L 58/33 429/429 |
| 2014/0193725 | A1* | 7/2014 | Schaevitz | H01M 8/04753 429/414 |
| 2014/0295307 | A1* | 10/2014 | Toida | B60L 50/51 429/432 |
| 2015/0260097 | A1* | 9/2015 | Fujita | F02C 6/18 60/772 |

FOREIGN PATENT DOCUMENTS

| | | | |
|---|---|---|---|
| JP | 2008210632 A | * | 9/2008 |
| JP | 2009-17029 A | | 1/2009 |
| JP | 2009-170209 A | | 7/2009 |
| JP | 2009-283243 A | | 12/2009 |
| JP | 2009283243 A | * | 12/2009 |
| JP | 2014-36007 A | | 2/2014 |

* cited by examiner

FUEL CELL SYSTEM AND CONTROL METHOD OF FUEL CELL SYSTEM

TECHNICAL FIELD

The present invention relates to a fuel cell system and a control method of the fuel cell system.

BACKGROUND ART

Interest in global environmental problems has grown in recent years, and the usage of various fuel cells such as a solid polymer fuel cell and a solid oxide fuel cell is thus examined for a vehicle. Each of these fuel cells generates power by an electrochemical reaction between anode gas containing hydrogen, hydrocarbons and the like and cathode gas containing oxygen.

SUMMARY OF INVENTION

The fuel cell after generating power by the electrochemical reaction as described above discharges fuel gas (anode off-gas) and air (cathode off-gas) not having been used for power generation. In the case of a solid polymer fuel cell, the anode off-gas containing a large amount of hydrogen is not allowed to be discharged directly from a vehicle to the outside, and thus needs to be diluted with air becomes predetermined concentration or less.

JP2009-170209A discloses a technique of diluting the anode off-gas discharged by a solid polymer fuel cell with cathode off-gas, further diluting the gas properly with air introduced from the outside, and thereafter discharging the resultant gas.

On the other hand, in the case of a solid oxide fuel cell efficiently generating power, the fuel cell operates at a high temperature of approx. 800° C., and accordingly the fuel cell after the power generation discharges high-temperature anode off-gas and high-temperature cathode off-gas. From the viewpoint of a discharging heat temperature, it is difficult to directly discharge the anode off-gas and the cathode off-gas described above to the outside of the system in some operating conditions of the fuel cell system, and accordingly the gases need to be cooled to a temperature at which the discharging is allowed.

An object of the present invention is to provide a technique for cooling the anode off-gas and the cathode off-gas to be discharged by a solid oxide fuel cell to a temperature at which discharging to the outside of a fuel cell system is allowed.

The fuel cell system according to one embodiment of the present invention includes the solid oxide fuel cell configured to generate power by receiving the supply of the cathode gas and the anode gas. The fuel cell system includes a discharging passage configured to discharge the cathode off-gas and the anode off-gas discharged by the fuel cell as discharged gas to the outside, a discharged-gas temperature detection unit configured to detect or estimate the temperature of the discharged gas discharged from the discharging passage, an air supplying unit configured to supply air to the discharging passage, and the control unit configured to control the air supply to be executed by an air supplying unit on the basis of the detected or estimated temperature.

The following describes the embodiments of the present invention in detail with accompanying drawings.

BRIEF DESCRIPTION OF DRAWINGS

FIG. 3 is a diagram for explaining a relation between a discharged gas temperature and a vehicle condition and the like.

DESCRIPTION OF EMBODIMENTS

Some embodiments of the present invention will be described below with reference to the drawings and the like.

First Embodiment

Figure 1:
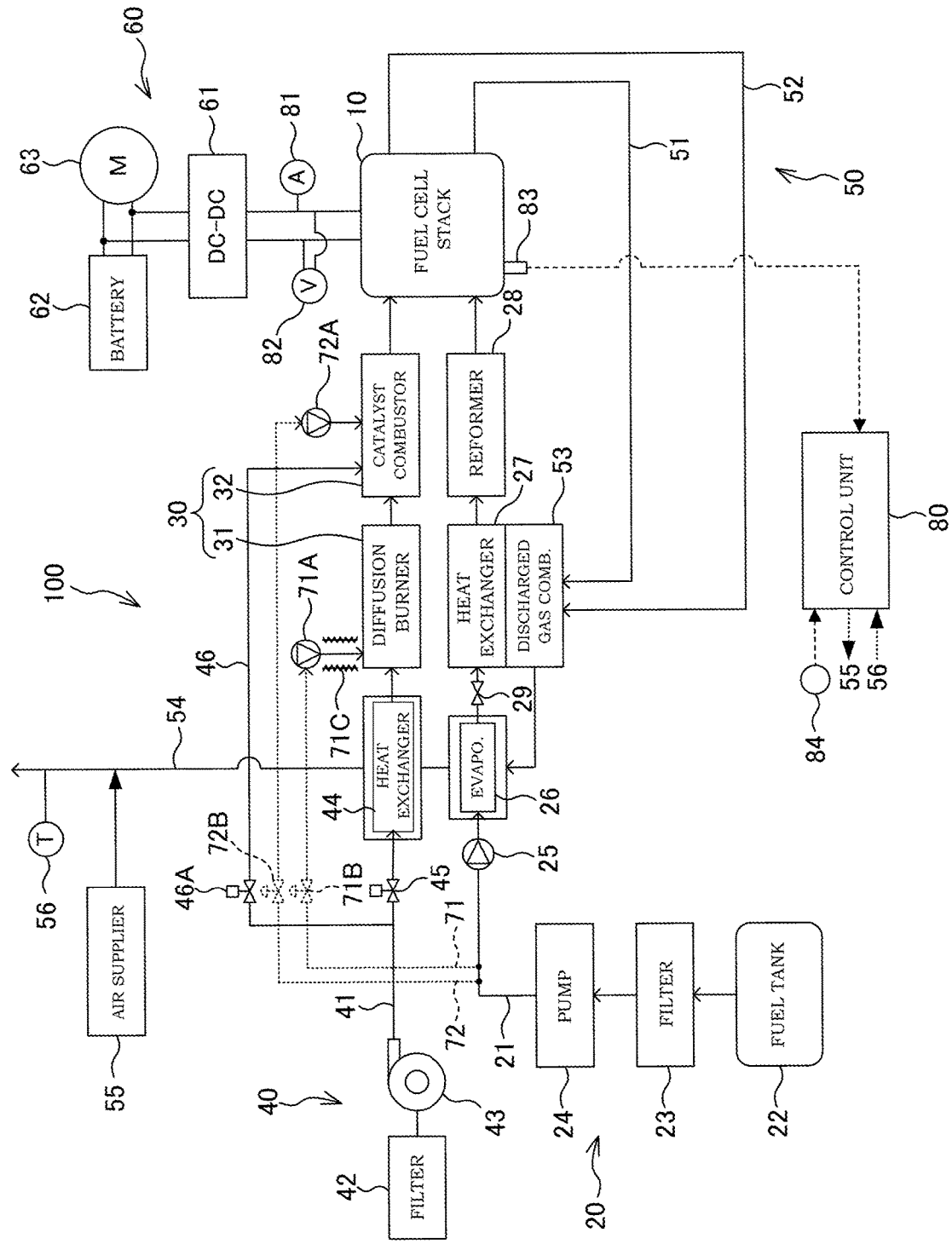
FIG. 1 is a schematic configuration diagram illustrating the main configuration of a fuel cell system according to a first embodiment.

FIG. 1 is a schematic configuration diagram illustrating the main configuration of a fuel cell system 100 according to the first embodiment.

As shown in FIG. 1, the fuel cell system 100 includes a solid oxide fuel cell stack 10 configured to generate power by receiving a supply of anode gas (fuel gas) and cathode gas (oxidant gas).

The fuel cell stack 10 is a layer built cell in which a plurality of solid oxide fuel cells (SOFC) are laminated. One solid oxide fuel cell (unit cell of the fuel cell) is configured in such a manner that an electrolyte layer formed of a solid oxide such as ceramic is sandwiched by an anode electrode to which anode gas is supplied and a cathode electrode to which cathode gas is supplied. In an example, the anode gas contains hydrogen and hydrocarbons, while the cathode gas contains oxygen and the like.

The fuel cell system 100 is configured with an anode gas supplying system 20 configured to supply anode gas to the fuel cell stack 10, a system activation system 30 used when the system is activated, a cathode gas supplying system 40 configured to supply cathode gas to the fuel cell stack 10, a discharging system 50 configured to discharge the anode off-gas and the cathode off-gas discharged by the fuel cell stack 10, and a power system 60 configured to perform inputting and outputting of power with respect to the fuel cell stack 10. The fuel cell system 100 further includes a control unit 80 configured to comprehensively control an operation of the entire system.

The anode gas supplying system 20 includes an anode supplying passage 21, a fuel tank 22, a filter 23, a pump 24, an injector 25, an evaporator 26, a heat exchanger 27, a reformer 28, and the like.

The anode supplying passage 21 connects between the fuel tank 22 and an anode flow passage formed in the fuel cell stack 10.

The fuel tank 22 is a container configured to store liquid fuel for reforming, which is obtained by mixing, for example, ethanol and water. The pump 24 is disposed on a downstream side of the fuel tank 22 in the anode supplying passage 21. The pump 24 sucks the fuel for reforming stored in the fuel tank 22 to supply the fuel to the injector 25 and the like.

The filter 23 is disposed between the fuel tank 22 and the pump 24 in the anode supplying passage 21. The filter 23 removes foreign matter and the like contained in the fuel for reforming before the sucking by the pump 24.

The injector 25 is disposed between the pump 24 and the evaporator 26 in the anode supplying passage 21. The injector 25 injects and supplies the fuel supplied by the pump 24 into the evaporator 26.

The evaporator 26 is disposed on a downstream side of the injector 25 in the anode supplying passage 21. The evaporator 26 vaporizes the fuel supplied by the injector 25, and supplies the fuel to the heat exchanger 27. The evaporator 26 vaporizes the fuel by using heat of discharged gas discharged by a discharged gas combustor 53 to be described below.

The heat exchanger 27 is disposed on a downstream side of the evaporator 26 in the anode supplying passage 21, so as to be adjacent to the discharged gas combustor 53. The heat exchanger 27 further heats the fuel vaporized in the evaporator 26, by using heat transferred from the discharged gas combustor 53. A pressure control valve 29 configured to control the pressure of the vaporized fuel to be supplied to the heat exchanger 27 is disposed between the evaporator 26 and the heat exchanger 27 in the anode supplying passage 21. An opening degree of the pressure control valve 29 is controlled by the control unit 80.

The reformer 28 is disposed between the heat exchanger 27 and the fuel cell stack 10 in the anode supplying passage 21. The reformer 28 reforms the fuel by using a catalyst provided in the reformer 28. The fuel for reforming is reformed into the anode gas containing hydrogen, hydrocarbons, carbon monoxide, and the like by a catalytic reaction in the reformer 28. Such reformed anode gas in a high temperature state is supplied to the anode flow passage in the fuel cell stack 10.

It is noted that the anode supplying passage 21 includes a branch passage 71, a branch passage 72 and a branch passage 73 each branching from the anode supplying passage 21. The branch passage 71 branches at a portion between the pump 24 and the injector 25 from the anode supplying passage 21, and is connected to an injector 71A configured to supply the fuel to a diffusion burner 31. An opening/closing valve 71B configured to open and close the branch passage 71 is disposed in the branch passage 71. The branch passage 72 branches at a portion between the pump 24 and the injector 25 from the anode supplying passage 21, and is connected to an injector 72A configured to supply the fuel to a catalyst combustor 32. An opening/closing valve 72B configured to open and close the branch passage 72 is disposed in the branch passage 72. The injector 71A includes an electric heater 71C serving as a heating device for vaporizing the liquid fuel.

The opening degree of each of the above-described opening/closing valves 71B, 72B is controlled by the control unit 80. In an example, the opening/closing valves 71B, 72B are opened when the fuel cell system 100 is activated, and are closed after completion of the activation.

The next descriptions with reference to FIG. 1 are about the cathode gas supplying system 40 and the system activation system 30.

The cathode gas supplying system 40 includes a cathode supplying passage 41, a filter 42, a compressor 43, a heat exchanger 44, and the like. The system activation system 30 includes the diffusion burner 31, the catalyst combustor 32, and the like.

The cathode supplying passage 41 connects between the compressor 43 and the cathode flow passage formed in the fuel cell stack 10.

The compressor 43 is an air supplying device configured to introduce outside air (air) through the filter to supply the introduced air as cathode gas to the fuel cell stack 10 and the like. The filter 42 removes the foreign matter contained in the air to be introduced to the compressor 43.

The heat exchanger 44 is disposed on a downstream side of the compressor 43 in the cathode supplying passage 41. The heat exchanger 44 heats the cathode gas (air), by using the heat of the discharged gas discharged by the discharged gas combustor 53. The cathode gas heated by the heat exchanger 44 is supplied to the diffusion burner 31 partially constituting the system activation system 30.

A throttle 45 (flow rate adjusting unit) is disposed at a portion between the compressor 43 and the heat exchanger 44 in the cathode supplying passage, so as to adjust a flow rate of the cathode gas according to an opening degree of the throttle 45. The opening degree of the throttle 45 is controlled by the control unit 80.

It is noted that the cathode supplying passage 41 includes a branch passage 46 branching from the cathode supplying passage 41. The branch passage 46 branches at a portion between the compressor 43 and the throttle 45 from the cathode supplying passage 41, and is connected to the catalyst combustor 32 to be described below. A throttle 46A is attached to the branch passage 46, so as to adjust an air flow amount according to an opening degree of the throttle 46A. The opening degree of the throttle 46A is controlled by the control unit 80. The throttle 46A is opened so as to supply a certain amount of air to the catalyst combustor 32 when the fuel cell system 100 is activated, and is closed after the completion of the activation.

The diffusion burner 31 and the catalyst combustor 32 included in the system activation system 30 are used in general during system activation.

The diffusion burner 31 is disposed on a downstream side of the heat exchanger 44 in the cathode supplying passage 41. When the system is activated, the air supplied by the compressor 43 and the fuel injected by the injector 71A are supplied into the diffusion burner 31. The fuel to be injected by the injector 71A is heated by the electric heater 71C, and the fuel in a vaporized state is supplied to the diffusion burner 31. Thereafter, a mixer is ignited by an ignition device attached to the diffusion burner 31, whereby a preheating burner for heating the catalyst combustor 32 is formed.

After the completion of the activation, the supply of the fuel and the operation of the ignition device are terminated, and the air supplied by the compressor 43 is supplied to the catalyst combustor 32 through the diffusion burner 31.

The catalyst combustor 32 is disposed at a portion between the diffusion burner 31 and the fuel cell stack 10 in the cathode supplying passage 41. The catalyst combustor 32 includes a catalyst inside, and generates high-temperature combustion gas by using the catalyst. When the system is activated, the air from the branch passage 46 and the fuel injected by the injector 72A are supplied into the catalyst combustor 32. The catalyst of the catalyst combustor 32 is heated by the preheating burner, and the air and the fuel are burned over the heated catalyst, thereby generating combustion gas. The combustion gas, which is high-temperature inert gas hardly containing oxygen, is supplied to the fuel cell stack 10 to heat the fuel cell stack 10 and the like.

After the completion of the activation, the supply of the fuel and the air respectively from the branch passages 72, 46 is terminated, and the air (anode gas) supplied by the compressor 43 is supplied to the fuel cell stack 10 through the diffusion burner 31 and the catalyst combustor 32.

The next description is about the discharging system 50. The discharging system 50 includes an anode discharging passage 51, a cathode discharging passage 52, the discharged gas combustor 53, a joined discharged-gas passage 54, an air supplier 55, a temperature sensor 56, and the like.

The anode discharging passage 51 connects the anode flow passage in the fuel cell stack 10 and an anode-side inlet portion of the discharged gas combustor 53. The anode discharging passage 51 allows the gas (anode off-gas) containing the anode gas discharged from the anode flow passage in the fuel cell stack 10 to flow.

The cathode discharging passage 52 connects the cathode flow passage in the fuel cell stack 10 and the cathode-side inlet portion of the discharged gas combustor 53. The cathode discharging passage 52 allows the gas (cathode off-gas) containing the cathode gas discharged from the cathode flow passage in the fuel cell stack 10 to flow.

The discharged gas combustor 53 catalytically combusts the anode off-gas and the cathode off-gas respectively supplied from the discharging passages 51, 52, thereby generating the combustion gas (discharged gas) mainly containing carbon dioxide and water.

It is noted that since the discharged gas combustor 53 is disposed adjacent to the heat exchanger 27, heat from the catalytic combustion by the discharged gas combustor 53 is transferred to the heat exchanger 27. The heat transferred to the heat exchanger 27 in such a manner is used to heat the fuel.

The joined discharged-gas passage 54 is connected to a gas outlet portion (downstream end) of the discharged gas combustor 53. The discharged gas discharged by the discharged gas combustor 53 is discharged to the outside of the fuel cell system 100 through the joined discharged-gas passage 54. Specifically, the joined discharged-gas passage 54 functions as a discharging passage configured to cause the discharged gas discharged by the discharged gas combustor 53 to be discharged into the atmosphere. The joined discharged-gas passage 54 is configured so as to pass through the evaporator 26 and the heat exchanger 44. The evaporator 26 and the heat exchanger 44 are heated by the discharged gas flowing through the joined discharged-gas passage 54.

In the fuel cell stack 10 configured with solid oxide fuel cells, stabilized zirconia is employed as electrolyte material, and oxygen ions are used as carriers. Thus, the fuel cell stack 10 operates at a higher temperature than a solid polymer fuel cell. Accordingly, each of the anode off-gas and the cathode off-gas is discharged in a high temperature state by the fuel cell stack 10, and the discharged gas obtained by combusting the anode off-gas and the cathode off-gas in the discharged gas combustor 53 is discharged also in a high temperature state. Therefore, if the discharged gas in a high temperature state discharged by the discharged gas combustor 53 is discharged as it is to the outside of the fuel cell system 100 (hereinafter, simply referred to as the outside of the system), the discharged gas temperature may be higher than the allowable temperature at which the discharging to the outside of the system is allowed, in some operating conditions of the fuel cell system 100. Accordingly, the fuel cell system 100 of the present embodiment dilutes the high-temperature discharged gas with outside air (air) in the joined discharged-gas passage 54, thereby lowering the discharged gas temperature to a temperature at which the discharging to the outside of the system is allowed.

It is noted that the fuel cell system according to the present invention is not always required to include the discharged gas combustor 53 described above. The fuel cell system without the discharged gas combustor 53 is configured in such a manner that the anode off-gas discharged by the fuel cell stack 10 is discharged through the anode discharging passage 51, while the cathode off-gas is discharged through the cathode discharging passage 52, respectively as discharged gas to the outside of the system. The fuel cell system even without the discharged gas combustor 53 may be configured in such a manner that the anode discharging passage 51 and the cathode discharging passage 52 are joined to form the joined discharged-gas passage 54, whereby the off-gases discharged by the fuel cell stack 10 are discharged as discharged gas through the joined discharged-gas passage 54 to the outside of the system.

The air supplier 55, which is a compressor as an example, functions as an air supplying unit configured to supply air to the joined discharged-gas passage 54. Specifically, the air supplier 55 introduces outside air (air) in order to lower the discharged gas temperature to a temperature at which the discharging to the outside of the system is allowed, and supplies the introduced air to the joined discharged-gas passage 54, thereby lowering the temperature of the discharged gas discharged by the discharged gas combustor 53.

It is noted that in the case where the cathode off-gas and the anode off-gas are discharged respectively through the anode discharging passage 51 and the cathode discharging passage 52 to the outside of the system, the air supplier 55 is configured so as to supply air to the anode discharging passage 51 and the cathode discharging passage 52.

The temperature sensor 56 functions as a discharged-gas temperature detection unit configured to detect the temperature of the discharged gas discharged by the discharged gas combustor 53. The temperature sensor 56 is disposed in the vicinity of a terminus of the joined discharged-gas passage 54 or at least on a downstream side of a junction point of the air supplied by the air supplier 55 and the discharged gas discharged by the discharged gas combustor 53. Accordingly, temperature sensor 56 is capable of detecting the temperature of the discharged gas after being diluted with the air supplied by the air supplier 55.

It is noted that in the case where the cathode off-gas and the anode off-gas are discharged respectively through the anode discharging passage 51 and the cathode discharging passage 52 to the outside of the system, the temperature sensor 56 is disposed in the vicinity of a terminus of each of the anode discharging passage 51 and the cathode discharging passage 52, or at least on a downstream side of each of junction points with the air supplied by the air supplier 55.

An amount of the air supplied by the air supplier 55 to the joined discharged-gas passage 54 as described above varies in accordance with the discharged gas temperature. In other words, the amount of the air supplied by the air supplier 55 to the joined discharged-gas passage 54 is controlled on the basis of the temperature detected by the temperature sensor 56. The control will be detailed below.

The next description is about the power system 60. The power system 60 includes a DC-DC converter 61, a battery 62, a drive motor 63, and the like.

The DC-DC converter 61 is electrically connected to the fuel cell stack 10, and boosts the voltage output by the fuel cell stack 10 to supply power to the battery 62 or the drive motor 63. The battery 62 is configured so as to be charged with the power supplied by the DC-DC converter 61, or to supply power to the drive motor 63.

The drive motor 63, which is a three-phase AC motor, functions as a power source of a vehicle. The drive motor 63 is connected to the battery 62 and the DC-DC converter 61 via an inverter. The drive motor 63 generates regenerative power during braking, and the regenerative power is used to charge the battery 62, as an example.

The control unit 80 is configured with a microcomputer including a central processing unit (CPU), a read only memory (ROM), a random access memory (RAM), and an input/output interface (I/O interface). The control unit 80 executes processing for controlling the fuel cell system 100 including the above-described air supplier 55, by executing a specific program.

The control unit 80 receives signals from various sensors such as a current sensor 81, a voltage sensor 82 and a temperature sensor 83, and also receives signals from various sensors configured to detect vehicle conditions, such as an accelerator stroke sensor 84 configured to detect a depressed amount of an accelerator pedal, and the above-described temperature sensor 56 configured to detect the discharged gas temperature.

The current sensor 81 detects the output current taken out from the fuel cell stack 10. The voltage sensor 82 detects the voltage output by the fuel cell stack 10, that is, the inter-terminal voltage between an anode electrode side terminal and a cathode electrode side terminal. The temperature sensor 83 is disposed on the fuel cell stack 10, and detects or estimates the temperature of the fuel cell stack 10.

The above description is about the main configuration of the fuel cell system 100 according to the first embodiment. The next description based on the premise of the above configuration is about air control performed on the air supplier 55 having the characteristic configuration according to the present invention. The air control is executed by the control unit 80 (air control unit).

Air Control

Figure 2:
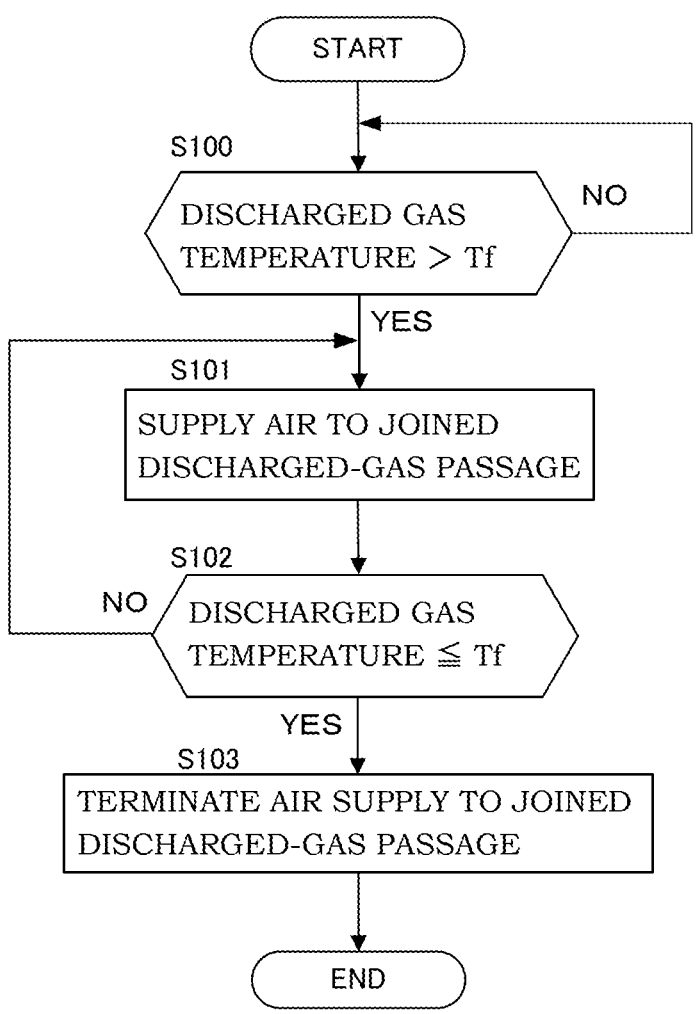
FIG. 2 is a flowchart indicating a flow of air control in the first embodiment.

FIG. 2 is a flowchart indicating a flow of the air control to be executed by the control unit 80 of the fuel cell system 100 according to the present embodiment. The air control is executed from when the fuel cell system 100 is activated until when the fuel cell system 100 is stopped.

In step S100, the control unit 80 determines whether or not a discharged gas temperature Te detected by the temperature sensor 56 is higher than a temperature Tf at which the discharging to the outside of the system is allowed. In the case where the discharged gas temperature Te is higher than the temperature Tf, the discharged gas temperature is so high that the discharging to the outside of the system is not allowed, and accordingly the following processing in step S101 is executed. In the case where the discharged gas temperature Te is equal to or lower than the temperature Tf, the discharged gas temperature is a temperature at which the discharging to the outside of the system is allowed, and accordingly step S100 is looped until the discharged gas temperature exceeds the temperature Tf, thereby continuing monitoring as to whether or not the discharged gas temperature is equal to or lower than the temperature at which the discharging to outside of the system is allowed. It is noted that the temperature Tf is set to a temperature equal to or lower than an upper limit temperature at which the discharging to the outside of the system is allowed.

In step S101, the air supplier 55 supplies air to the joined discharged-gas passage 54 in order to dilute the high-temperature discharged gas discharged by the discharged gas combustor 53. It is noted that an amount of the air to be supplied may be variable according to the detected discharged gas temperature. In this case, the air supplier 55 is configured so that a larger amount of air is supplied as the detected discharged gas temperature is higher.

In step S102, the control unit 80 determines whether or not the discharged gas temperature Te is higher than the temperature Tf at which the discharging to the outside of the system is allowed. In the case where the discharged gas has been diluted with the air supplied by the air supplier 55, and the discharged gas temperature Te is thus lowered to a temperature equal to or lower than the temperature Tf, the process proceeds to step S103. In the case where the discharged gas temperature Te is higher than the temperature Tf, the processing in step S101 is repeatedly executed in order that the air supplied by the air supplier 55 continues to be supplied until the discharged gas temperature is lowered to a temperature equal to or lower than the temperature Tf.

In step S103, since the control unit 80 has determined that the discharged gas temperature Te is lowered to a temperature equal to or lower than the temperature Tf at which discharging to the outside of the system is allowed, the supply of the air by the air supplier 55 is terminated and the present processing is terminated. It is noted that the value of the discharged gas temperature Tf varies depending on vehicle conditions and the like.

Figure 3:
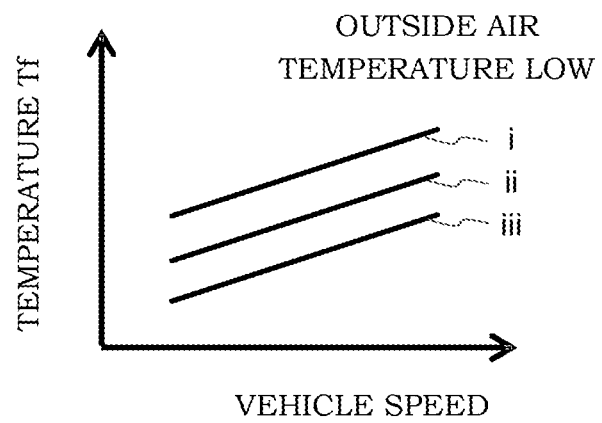

FIG. 3 shows one example of a method of setting the discharged gas temperature Tf, and is a diagram for explaining a relation between the discharged gas temperature Tf and vehicle conditions and the like in the case where the fuel cell system 100 is used in a vehicle. The vertical axis indicates a value of the discharged gas temperature Tf, while the horizontal axis indicates a vehicle speed. Also, i, ii, and iii in the drawing respectively represent the relations between the discharged gas temperature Tf and the vehicle speed under different temperatures of outside air. The reference signs of i, ii, and iii respectively represent the temperatures of outside air which are higher successively in this order.

As shown in the drawing, the value of the discharged gas temperature Tf is set on the basis of a vehicle speed, so that the value is higher as the vehicle speed is faster. The value of the discharged gas temperature Tf is set on the basis of a temperature of outside air, so that the value is higher as the temperature of outside air is lower. This enables more appropriate setting of the discharged gas temperature Tf as the temperature at which the discharging to the outside of the system is allowed.

Figure 4:
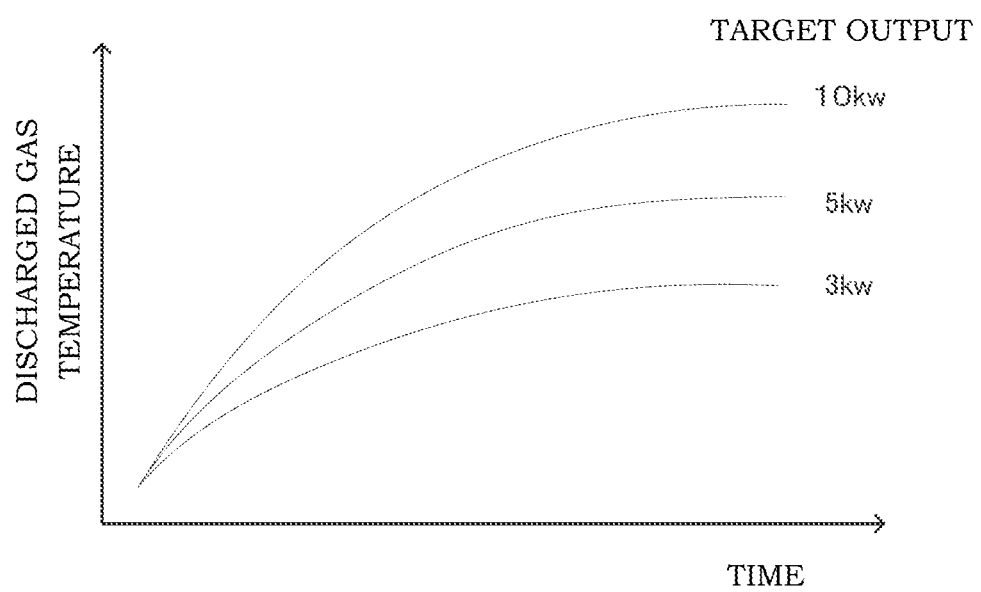
FIG. 4 is a diagram indicating a relation among a target output, an operating time and a discharged gas temperature, in a fuel cell stack.

Although the discharged gas temperature Te is detected by the temperature sensor 56 in the description above, the discharged gas temperature Te is not always necessary to be detected by the sensor. The discharged gas temperature Te may be estimated on the basis of the operating conditions of the fuel cell system 100. In an example, the relation among a target output of the fuel cell stack 10, an operation time, and a discharged gas temperature Te obtained by experiments or the like is presented as a table as shown in FIG. 4, and such a table is stored in advance. By referring to the table, the discharged gas temperature Te is enabled to be estimated on the basis of the relation with a target output and a time.

As described above, the fuel cell system 100 according to the first embodiment includes the solid oxide fuel cell stack 10 configured to generate power by receiving the supply of the cathode gas and the anode gas. The fuel cell system 100 includes the joined discharged-gas passage 54 configured to discharge the cathode off-gas and the anode off-gas discharged by the fuel cell stack 10 as discharged gas to the outside of the system, the temperature sensor 56 or the control unit 80 configured to detect or estimate the temperature of the discharged gas discharged from the joined discharged-gas passage 54, the air supplier 55 configured to supply air to the discharging passage, and the control unit 80 configured to control the air supply to be executed by the air supplier 55 on the basis of the detected or estimated temperature. This enables lowering of the temperature of the high-temperature gas discharged by the discharged gas combustor 53 to a temperature at which the discharging to the outside of the system is allowed.

According to the fuel cell system 100 of the first embodiment, the control unit 80 controls the air supplier 55 so that the discharged gas discharged from the discharging passage is cooled to a temperature equal to or lower than a predetermined temperature (discharged gas temperature Tf), specifically, a temperature equal to or lower than the upper limit temperature at which the discharging to the outside of the system is allowed. This enables the lowering of the temperature of the high-temperature gas in the joined discharged-gas passage 54 discharged by the discharged gas combustor 53 to a temperature at which the discharging to the outside of the system is allowed.

According to the fuel cell system 100 of the first embodiment, the fuel cell system is used in a vehicle, and the temperature at which the discharging to the outside of the vehicle is allowed is set according to a vehicle speed, so that the temperature is higher as the vehicle speed is faster. Accordingly, even in the case where the discharged gas temperature at the time of the discharging to the outside of the vehicle is set higher, the discharged gas and outside air are mixed more quickly as the vehicle speed is faster, and the discharged gas temperature is thus lowered in a shorter time. As a result, the allowable temperature of the discharged gas discharged by the discharged gas combustor 53 is enabled to be set to a more appropriate value.

According to the fuel cell system 100 of the first embodiment, the allowable temperature at which the discharging to the outside of the system is allowed is set according to a temperature of outside air, so that the allowable temperature becomes higher as the temperature of outside air is lower. Accordingly, even in the case where the discharged gas temperature at the time of the discharging to the outside of the system is high, the temperature of the discharged gas mixed with outside air is more easily lowered as the temperature of outside air is lower. As a result, the allowable temperature of the discharged gas discharged by the discharged gas combustor 53 is enabled to be set to a more appropriate value.

Second Embodiment

The next description is about a fuel cell system 200 of a second embodiment. The fuel cell system 200 of the present embodiment is different from that of the first embodiment in the configuration of the joined discharged-gas passage 54.

Figure 5:
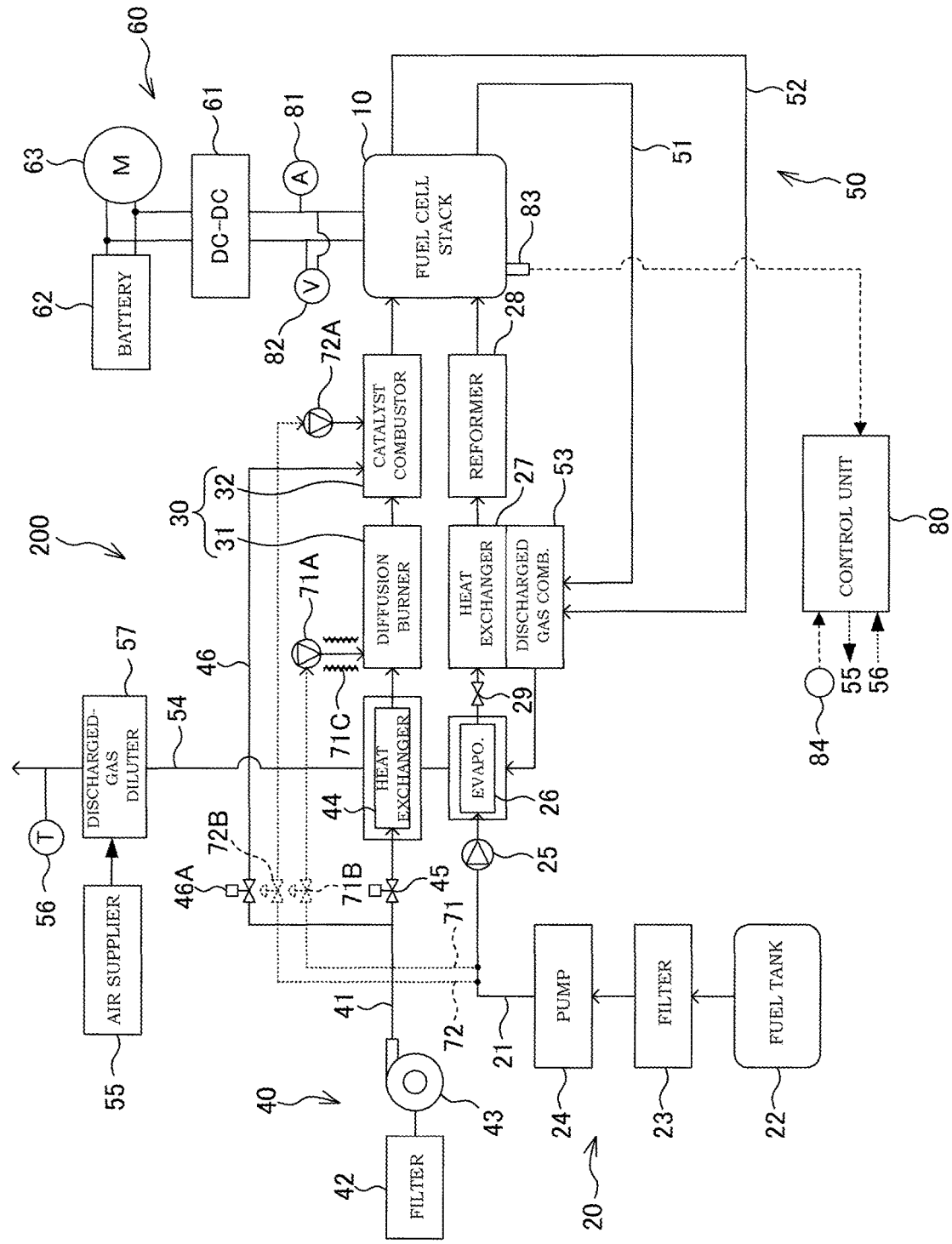
FIG. 5 is a schematic configuration diagram illustrating the main configuration of a fuel cell system according to a second embodiment.

FIG. 5 is a diagram for explaining the fuel cell system 200 of the second embodiment. The fuel cell system 200 of the present embodiment includes a discharged-gas diluter 57 in the joined discharged-gas passage 54.

The discharged-gas diluter 57 is a portion which has a larger gas volume with a larger cross-sectional area than other portions in the joined discharged-gas passage 54. From the viewpoint of shape and arrangement, the discharged-gas diluter 57 may be, for example, a muffler generally included in a vehicle equipped with an internal combustion engine.

In the present embodiment, the air supplier 55 supplies air to the discharged-gas diluter 57. As described above, the discharged gas is diluted in the portion having an especially larger gas volume in the joined discharged-gas passage 54, thereby enabling more uniform mixing of the high-temperature discharged gas and the air. Since the discharged gas and the air are more efficiently mixed, in the case where the discharged gas temperature is detected by the temperature sensor 56 disposed on a downstream side of the discharged-gas diluter 57, the detected value is stabilized. It is noted that the temperature sensor 56 may be disposed inside the discharged-gas diluter 57.

As described above, according to the fuel cell system 200 of the second embodiment, the joined discharged-gas passage 54 has the discharged-gas diluter 57 which has a larger gas volume with a larger cross-sectional area than other portions in the joined discharged-gas passage 54, and the air supplier 55 supplies air to the discharged-gas diluter 57. This enables more efficient mixing of the high-temperature discharged gas discharged by the discharged gas combustor 53 and the air, thereby enabling more efficient dilution of the high-temperature discharged gas with the air.

Third Embodiment

The next description is about a fuel cell system 300 of a third embodiment. The fuel cell system 300 of the present embodiment is different from those of the first embodiment and the second embodiment in the air supply means to the joined discharged-gas passage 54. Details are described below with reference to the drawings.

Figure 6:
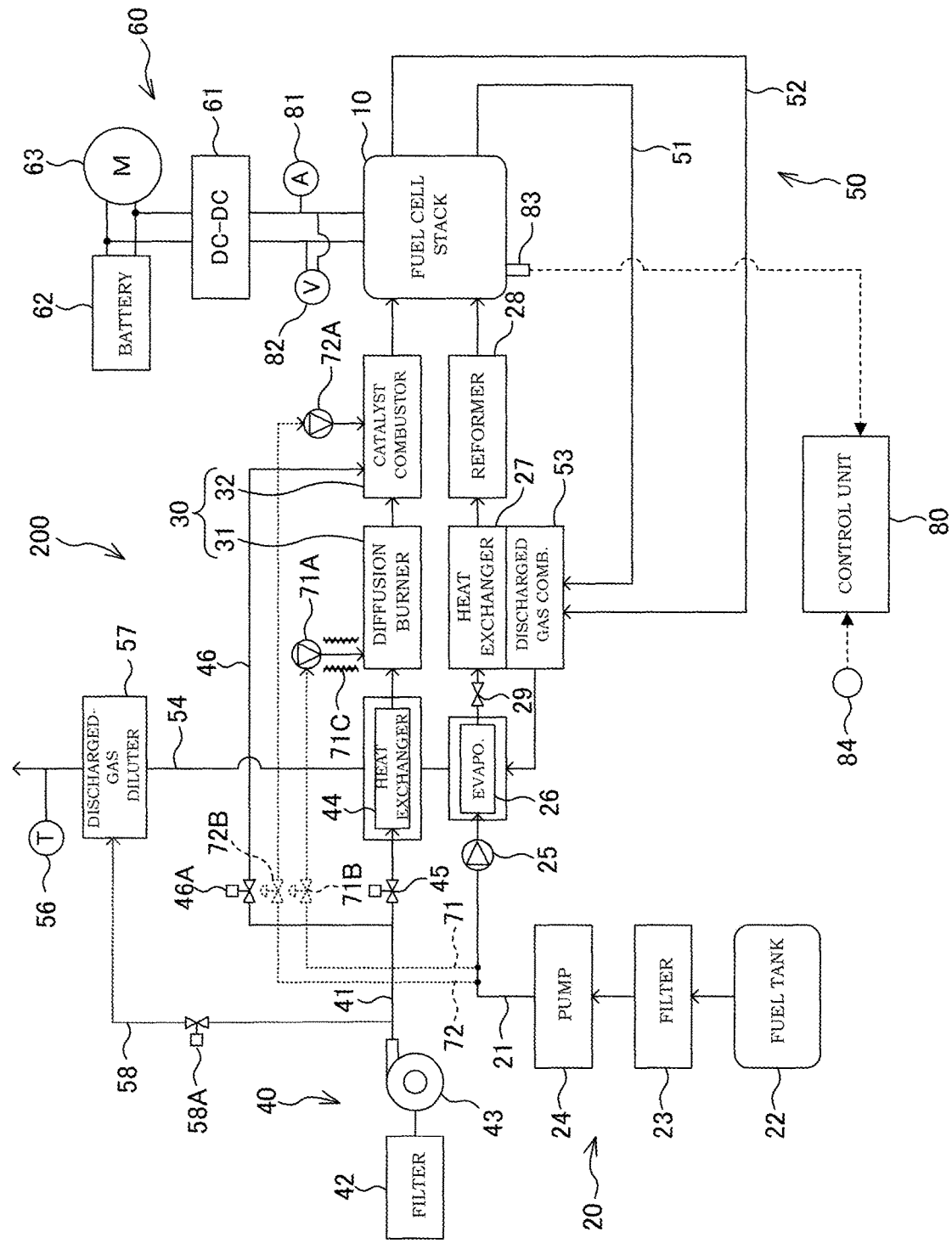
FIG. 6 is a schematic configuration diagram illustrating the main configuration of a fuel cell system according to a third embodiment.

FIG. 6 is a schematic configuration diagram illustrating the main configuration of the fuel cell system 300 of the present embodiment.

In the present embodiment, the compressor 43 functions as an air supplying unit configured to supply air to the joined discharged-gas passage 54. Specifically, the compressor 43 of the present embodiment has not only a function of supplying air to the cathode gas supplying system 40 configured to supply cathode gas to the fuel cell stack 10, but also a function of supplying air to the discharging system 50 configured to discharge the discharged gas discharged by the discharged gas combustor 53. It is noted that the air supplying passage of the cathode gas supplying system 40 uses the cathode supplying passage 41, while the air supplying passage of the discharging system 50 uses a supplying passage 58 for dilution. The cathode supplying passage 41 includes the throttles 45, 46A, while the supplying passage 58 for dilution includes a throttle 58A.

The next description is about the air supply rate control to be executed on the compressor 43, specifically the air supply rate adjustment processing for adjusting, on the basis of vehicle conditions and the like, the air supply rate to the cathode supplying passage 41 and the air supply rate to the supplying passage 58 for dilution.

As described above, the compressor 43 supplies air to the cathode supplying passage 41 and the supplying passage 58 for dilution. In this case, the compressor 43 has an upper limit in the air supply rate (a maximum air supply rate Amax). On the other hand, the air supply rate to the supplying passage 58 for dilution needs to be preferentially secured, in order to lower the temperature of the discharged gas discharged by the vehicle. Therefore, in the air supply rate adjustment processing to be described below, the air supply rate to the supplying passage 58 for dilution is secured, while the total flow rate of the air supply rate to the supplying passage 58 for dilution and to the cathode supplying passage 41 is made to be equal to or less than the maximum air supply rate Amax.

It is noted that the air supply rate to the supplying passage 58 for dilution and the air supply rate to the cathode supplying passage 41 are both adjusted according to the air flow rate supplied by the compressor 43 to be controlled on the basis of the air flow rate set by the air supply rate adjustment processing, and also according to the opening degree of each of the throttles 45, 46A, 58A. The compressor 43 and the opening degree of each throttle are controlled by the control unit 80.

Figure 7:
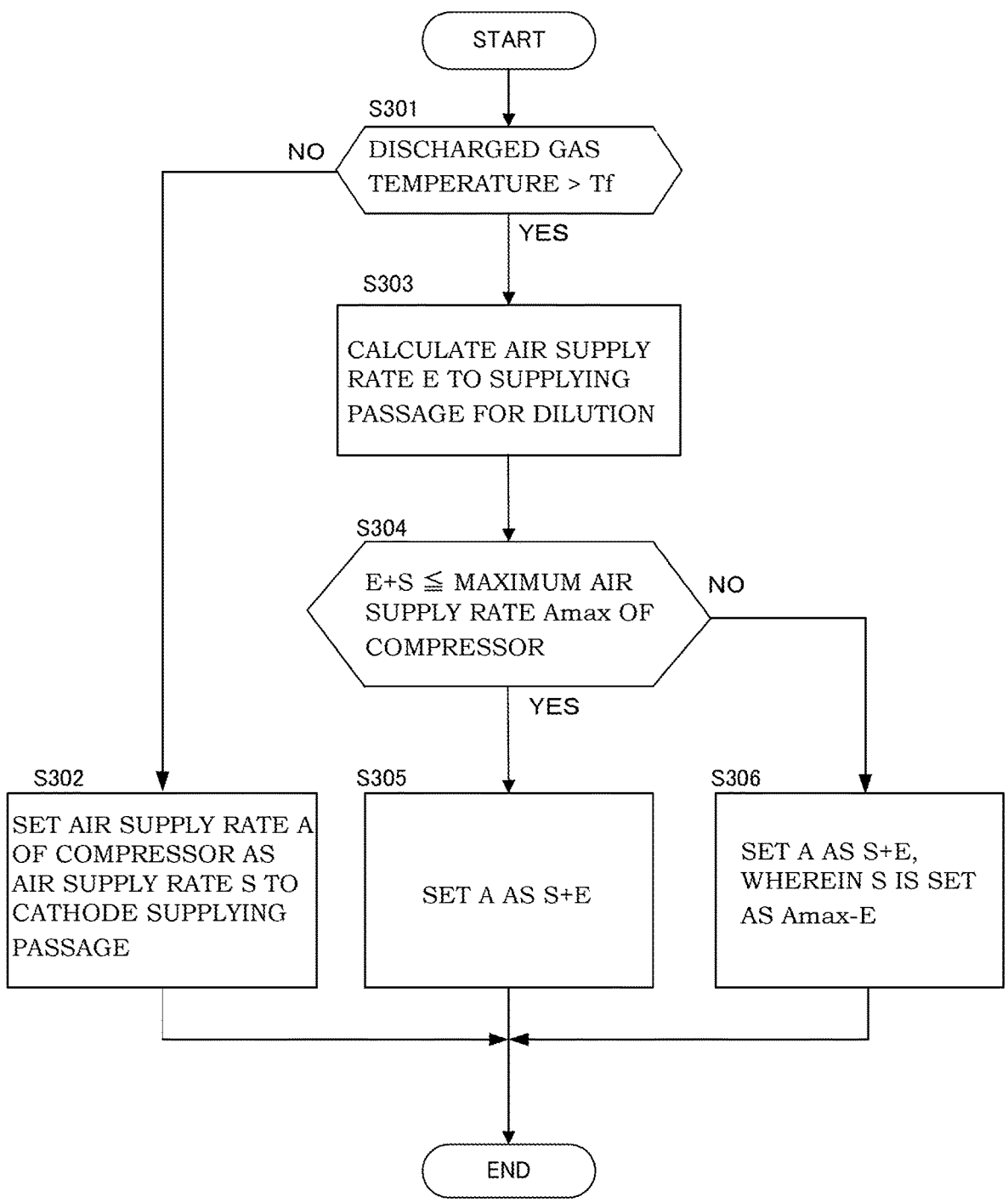
FIG. 7 is a flowchart for explaining a flow of air supply rate adjustment processing in the third embodiment.

FIG. 7 is a flowchart for explaining a flow of the air supply rate adjustment processing. The air supply rate adjustment processing is executed from when the fuel cell system 300 is activated until when the fuel cell system 300 is stopped.

In step S301, the control unit 80 determines whether or not the discharged gas temperature Te detected by the temperature sensor 56 is higher than the temperature Tf at which the discharging to the outside of the system is allowed. In the case where the discharged gas temperature Te is higher than the temperature Tf, the following processing in step S303 is executed. In the case where the discharged gas temperature Te is equal to or lower than the temperature Tf, the process proceeds to step S302.

In step S302, since the discharged gas temperature Te is equal to or lower than the temperature Tf, and thus air is not required to be supplied to the supplying passage 58 for dilution, the air flow rate to be supplied by the compressor 43 is set to an air supply rate S to be supplied to the cathode supplying passage 41. It is noted that the air supply rate S to be supplied to the cathode supplying passage 41 is calculated on the basis of the target power generation amount of the fuel cell set according to the operating conditions of the vehicle. After the air flow rate to be supplied by the compressor 43 is set to the air supply rate S, the present processing is terminated.

In step S303, the control unit 80 calculates an air supply rate E to be supplied to the supplying passage 58 for dilution, which is required to lower the discharged gas temperature Te to a temperature equal to or lower than the temperature Tf. After the air supply rate E is calculated, the processing in step S304 is executed.

In step S304, the control unit 80 determines whether or not the sum of the air supply rate E and the air supply rate S is equal to or less than the maximum air supply rate Amax of the compressor 43 (E+S≤Amax). In the case where E+S≤Amax is satisfied, the processing in step S305 is executed. In the case where E+S≤Amax is not satisfied, the processing in step S306 is executed.

In step S305, since the sum of the air supply rate E and the air supply rate S is equal to or less than the maximum air supply rate Amax of the compressor 43, the compressor 43 is able to sufficiently supply the air supply rate E and the air supply rate S. Accordingly, the control unit 80 sets the air supply rate to be supplied by the compressor 43, so as to supply the air supply rate E to the supplying passage 58 for dilution and to supply the air supply rate S to the cathode supplying passage 41. After the setting, the present processing is terminated.

The processing in step S306 is executed in the case where the sum of the air supply rate E and the air supply rate S is greater than the maximum air supply rate Amax of the compressor 43. In this case, the compressor 43 is not able to sufficiently supply the air supply rate E and the air supply rate S. Therefore, the control unit 80 reduces the air supply rate S to be supplied to the cathode supplying passage 41, thereby securing the air supply rate E to be supplied to the supplying passage 58 for dilution calculated in step S302. Specifically, in step S306, the control unit 80 sets, as the air supply rate E, the air supply rate to be supplied by the compressor 43 to the supplying passage 58 for dilution, and further sets the air supply rate S to be supplied to the cathode supplying passage 41 to a value obtained by subtracting the air supply rate E from the maximum air supply rate Amax of the compressor 43 (Amax-E). After the setting, the present processing is terminated.

This enables securement of the air supply rate E to be supplied to the supplying passage 58 for dilution, while the total flow rate of the air supply rate to be supplied to the supplying passage 58 for dilution and the cathode supplying passage 41 is set to a flow rate equal to or less than the maximum air supply rate Amax.

As described above, according to the fuel cell system 300 of the third embodiment, the compressor 43 serving as an air supplying unit is configured to supply air to the joined discharged-gas passage 54, and further to supply air as anode gas to the fuel cell stack 10. This enables unification of the air supply means to the joined discharged-gas passage 54 and the air supply means to the fuel cell stack 10, whereby the fuel cell system is enabled to be simplified.

According to the fuel cell system 300 of the third embodiment, in the case where the sum of the air supply rate to be supplied to the supplying passage 58 for dilution and the air supply rate to be supplied to the fuel cell stack 10 (cathode supplying passage 41) is greater than the maximum air supply rate Amax of the compressor 43, the air supply rate S to be supplied to the cathode supplying passage 41 is reduced. As a result, although the power generation amount of the fuel cell is limited temporarily, the discharged gas temperature and the power generation amount of the fuel cell stack 10 are enabled to be controlled comprehensively. Accordingly, regardless of the operating conditions of the fuel cell system 300, the air supply rate to be supplied to the supplying passage 58 for dilution is secured, thereby enabling lowering of the discharged gas temperature.

Fourth Embodiment

The next description is about a fuel cell system 400 of a fourth embodiment. The fuel cell system 400 of the present embodiment is different from that of the third embodiment in the method of securing the air supply rate to be supplied to the supplying passage 58 for dilution. More specifically, in the present embodiment, in the case where the sum of the air supply rate E and the air supply rate S is greater than the maximum air supply rate Amax of the compressor 43, the power generation amount adjustment processing for reducing the power generation amount of the fuel cell stack 10 is executed, thereby securing the air supply rate to be supplied to the supplying passage 58 for dilution. The power generation amount adjustment processing (power generation control) configured to control the power generation of the fuel cell stack 10 is executed by the control unit 80 (power generation control unit). The next description with reference to FIG. 8 is about the power generation amount adjustment processing of the present embodiment.

Figure 8:
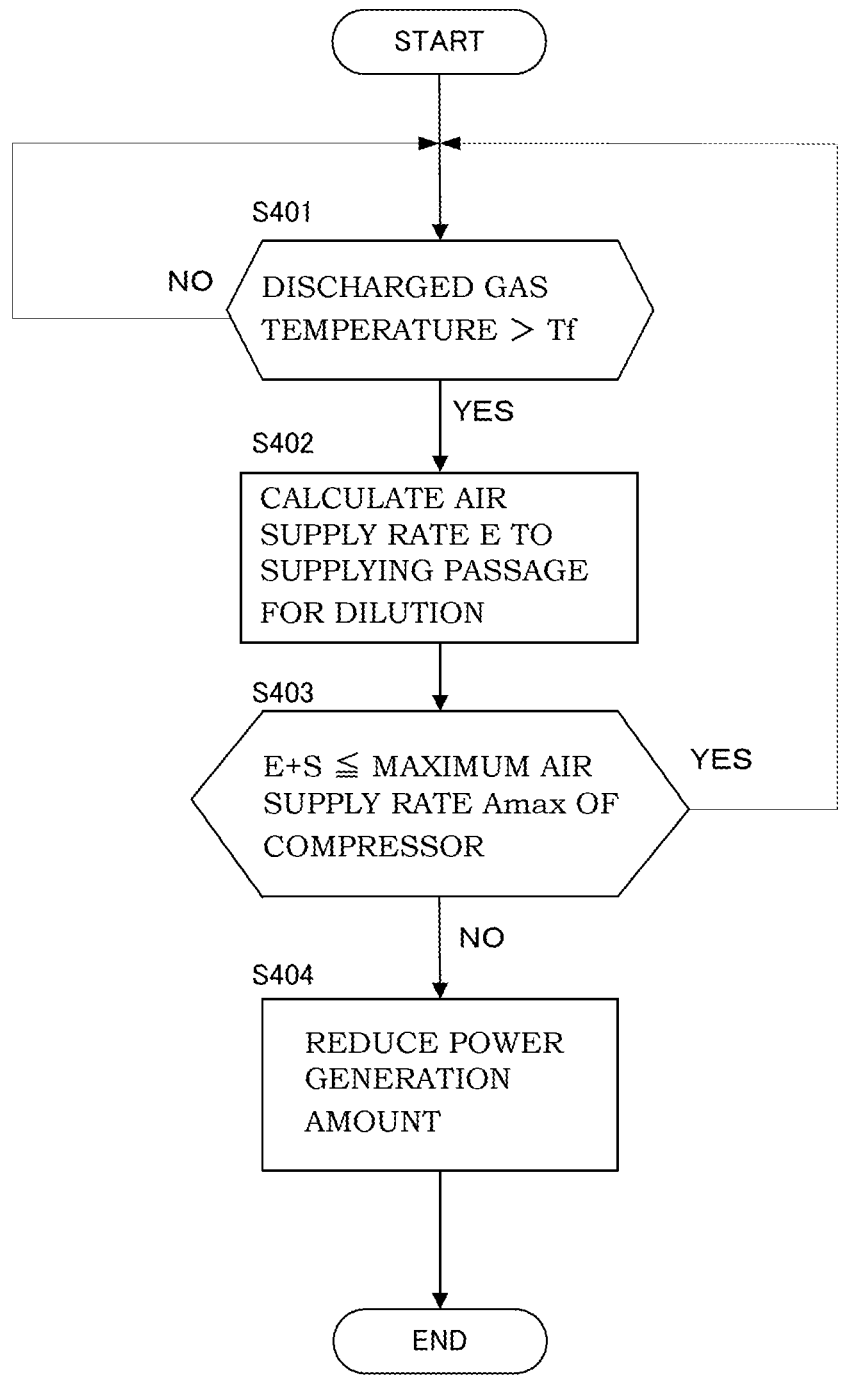
FIG. 8 is a flowchart for explaining a flow of power generation amount adjustment processing according to the third embodiment.

FIG. 8 is a flowchart for explaining a flow of the power generation amount adjustment processing. The power generation amount adjustment processing is executed from when the fuel cell system 400 is activated until when the fuel cell system 400 is stopped.

In step S401, the control unit 80 determines whether or not the discharged gas temperature Te detected by the temperature sensor 56 is higher than the temperature Tf at which the discharging to the outside of the system is allowed. In the case where the discharged gas temperature Te is higher than the temperature Tf, the discharged gas temperature is so high that the discharging to the outside of the system is not allowed, and accordingly the following processing in step S402 is executed. In the case where the discharged gas temperature Te is equal to or lower than the temperature Tf, the discharged gas temperature is a temperature at which the discharging to the outside of the system is allowed, and accordingly step S401 is looped until the discharged gas temperature exceeds the temperature Tf, thereby continuing monitoring as to whether or not the discharged gas temperature is equal to or lower than the temperature at which the discharging to outside of the system is allowed.

In step S402, the control unit 80 calculates the air supply rate E to be supplied to the supplying passage 58 for dilution, which is required to lower the discharged gas temperature Te to a temperature equal to or lower than the temperature Tf. After the air supply rate E is calculated, the processing in step S403 is executed.

In step S403, the control unit 80 determines whether or not the sum of the air supply rate E and the air supply rate S to be supplied to the cathode supplying passage 41 is equal to or less than the maximum air supply rate Amax of the compressor 43 (E+S≤Amax). In the case where E+S≤Amax is satisfied, the processing in step S404 is executed. In the case where E+S≤Amax is not satisfied, the set from step S401 to step S403 is looped until the discharged gas temperature exceeds the temperature Tf and further until E+S≤Amax is satisfied, thereby continuing monitoring as to whether or not the discharged gas temperature is equal to or lower than the temperature at which the discharging to outside of the system is allowed, and whether or not the sum of the air supply rate E and the air supply rate S to be supplied to the cathode supplying passage 41 is equal to or less than the maximum air supply rate Amax of the compressor 43.

In step S404, the control unit 80 reduces the power generation amount of the fuel cell stack 10 by a predetermined amount. When the power generation amount of the fuel cell stack 10 is reduced in the present processing, the air supply rate S required to be supplied to the cathode supplying passage 41 is reduced, resulting in enabling securement of the air supply rate to be supplied to the supplying passage 58 for dilution. It is noted that the predetermined amount when reducing the power generation amount is set to a value such that the sum of the air supply rate E and the air supply rate S to be supplied to the cathode supplying passage 41 as a result of reduction of the power generation amount is equal to or less than the maximum air supply rate Amax of the compressor 43. After the power generation amount of the fuel cell stack 10 is reduced, the present processing is terminated.

As described above, according to the fuel cell system 400 of the fourth embodiment, in the case where the sum of the air supply rate to be supplied to the supplying passage 58 for dilution and the air supply rate to be supplied to the fuel cell stack 10 (cathode supplying passage 41) is greater than the maximum air supply rate Amax of the compressor 43, the power generation amount of the fuel cell stack 10 is reduced. Accordingly, the cathode gas flow rate (air flow rate) required by the fuel cell stack 10 reduces, resulting in enabling securement of the air supply rate to be supplied to the supplying passage 58 for dilution.

The embodiments of the present invention have been described so far. The above-described embodiments are indicated merely as some of the application examples of the present invention. The technical scope of the present invention is not intended to be limited to the specific configurations of the above-described embodiments. In an example, although in the descriptions above the air supplier 55 or the compressor 43 functioning as an air supplying unit supplies air into the joined discharged-gas passage 54 or the discharged-gas diluter 57, the present invention is not necessarily limited thereto. Specifically, the air supplier 55 or the compressor 43 may supply air to the outer surface of the joined discharged-gas passage 54 or of the discharged-gas diluter 57. This enables cooling of the joined discharged-gas passage 54 or the discharged-gas diluter 57 itself with the air, resulting in enabling cooling of the discharged gas flowing therein. Alternatively, the air supplier 55 or the compressor 43 may supply air in the discharged gas after being discharged from the joined discharged-gas passage 54, to mix the discharged gas and the air, thereby lowering the discharged gas temperature.

Although the fuel cell systems according to the present invention have been described mainly in the case of being used in a vehicle, each of the fuel cell systems according to the present invention may be available in, for example, a household stationary fuel cell system and the like, not necessarily used in a vehicle.

The invention claimed is:

1. A fuel cell system comprising a solid oxide fuel cell configured to generate power by receiving supply of fuel gas and oxidant gas, the fuel cell system further comprising:
   a discharging passage configured to allow fuel off-gas and oxidant off-gas discharged by the fuel cell to be discharged as discharged gas to outside;
   a discharged-gas temperature detector configured to detect or estimate a temperature of the discharged gas to be discharged from the discharging passage;
   an air compressor configured to supply air to the discharging passage; and
   an air control computer configured to control air supply to be executed by the air compressor on a basis of the detected or estimated temperature, wherein:
   the air control computer is configured to control the air compressor so that the discharged gas to be discharged from the discharging passage becomes a predetermined temperature or lower,
   the fuel cell system is configured to be used in a vehicle,
   the predetermined temperature is set according to a vehicle speed, such that the predetermined temperature is higher as the vehicle speed is faster,
   the air compressor is configured so as to supply the air to the discharging passage and also to supply the air as the oxidant gas to the fuel cell, and
   when a sum of an air supply rate to be supplied to the discharging passage and an air supply rate to be supplied to the fuel cell is greater than a maximum air supply rate of the air compressor, the air control computer is configured to control the air compressor so as to reduce the air supply rate to be supplied to the fuel cell.

2. The fuel cell system according to claim 1, wherein the predetermined temperature is set according to a temperature of outside air, such that the predetermined temperature is higher as the temperature of outside air is lower.

3. The fuel cell system according to claim 1, wherein
the discharging passage has a discharged-gas diluting portion having a larger cross-sectional area than other portions in the discharging passage, and
the air compressor is configured to supply the air to the discharged-gas diluting portion.

4. A fuel cell system comprising a solid oxide fuel cell configured to generate power by receiving supply of fuel gas and oxidant gas, the fuel cell system further comprising:
a discharging passage configured to allow fuel off-gas and oxidant off-gas discharged by the fuel cell to be discharged as discharged gas to outside;
a discharged-gas temperature detector configured to detect or estimate a temperature of the discharged gas to be discharged from the discharging passage;
an air compressor configured to supply air to the discharging passage; and
an air control computer configured to control air supply to be executed by the compressor on a basis of the detected or estimated temperature, wherein:
the air control computer is configured to control the air compressor so that the discharged gas to be discharged from the discharging passage becomes a predetermined temperature or lower,
the fuel cell system is configured to be used in a vehicle,
the predetermined temperature is set according to a vehicle speed, such that the predetermined temperature is higher as the vehicle speed is faster,
a power generation computer configured to control a power generation condition of the fuel cell, wherein
when a sum of an air supply rate to be supplied to the discharging passage and an air supply rate to be supplied to the fuel cell is greater than a maximum air supply rate of the air compressor, the power generation computer is configured to reduce a power generation amount of the fuel cell.

5. A method of controlling a fuel cell system, the fuel cell system comprising:
a discharging passage configured to allow fuel off-gas and oxidant off-gas discharged by a solid oxide fuel cell to be discharged as discharged gas to atmosphere; and
an air compressor configured to supply air,
the method comprising:
acquiring a temperature of the discharged gas to be discharged from the discharging passage;
lowering the temperature of the discharged gas to a predetermined temperature or lower by using the air supplied by the air compressor according to the temperature of the discharged gas acquired,
the fuel cell system is used in a vehicle, and
the predetermined temperature is set according to a vehicle speed, such that the predetermined temperature is higher as the vehicle speed is faster,
the air compressor is configured so as to supply the air to the discharging passage and also to supply the air as oxidant gas to the fuel cell, and
when a sum of an air supply rate to be supplied to the discharging passage and an air supply rate to be supplied to the fuel cell is greater than a maximum air supply rate of the air compressor, reducing the air supply rate to be supplied to the fuel cell.

6. A method of controlling a fuel cell system, the fuel cell system comprising:
a discharging passage configured to allow fuel off-gas and oxidant off-gas discharged by a solid oxide fuel cell to be discharged as discharged gas to atmosphere; and
an air compressor configured to supply air,
the method comprising:
acquiring a temperature of the discharged gas to be discharged from the discharging passage;
lowering the temperature of the discharged gas to a predetermined temperature or lower by using the air supplied by the air compressor according to the temperature of the discharged gas acquired,
the fuel cell system is used in a vehicle, and
the predetermined temperature is set according to a vehicle speed, such that the predetermined temperature is higher as the vehicle speed is faster,
when a sum of an air supply rate to be supplied to the discharging passage and an air supply rate to be supplied to the fuel cell is greater than a maximum air supply rate of the air compressor, reducing a power generation amount of the fuel cell.

* * * * *